US012583280B2

(12) United States Patent
Randall et al.

(10) Patent No.: US 12,583,280 B2
(45) Date of Patent: Mar. 24, 2026

(54) DAMPER WITH INTEGRATED ROLL CONTROL SYSTEM

(71) Applicant: Fox Factory, Inc., Duluth, GA (US)

(72) Inventors: Connor Randall, Poncha Springs, CO (US); Mike Labbe, Scotts Valley, CA (US)

( * ) Notice: Subject to any disclaimer, the term of this patent is extended or adjusted under 35 U.S.C. 154(b) by 0 days.

(21) Appl. No.: 19/209,028

(22) Filed: May 15, 2025

(65) Prior Publication Data

US 2025/0353347 A1 Nov. 20, 2025

Related U.S. Application Data

(60) Provisional application No. 63/648,050, filed on May 15, 2024.

(51) Int. Cl.
B60G 17/08 (2006.01)
F16F 9/48 (2006.01)

(52) U.S. Cl.
CPC ................ B60G 17/08 (2013.01); F16F 9/48 (2013.01); *B60G 2202/24* (2013.01); *B60G 2500/112* (2013.01); *B60G 2800/012* (2013.01); *F16F 2230/183* (2013.01)

(58) Field of Classification Search
CPC ................ B60G 17/08; B60G 2202/24; B60G 2500/112; B60G 2800/012; F16F 9/48; F16F 2230/183
See application file for complete search history.

(56) References Cited

U.S. PATENT DOCUMENTS

| | | | | | |
|---|---|---|---|---|---|
| 5,447,332 | A | * | 9/1995 | Heyring | ................ B60G 21/06 280/124.161 |
| 6,102,418 | A | * | 8/2000 | Runkel | ................ B60G 21/06 280/124.159 |
| 10,358,010 | B2 | * | 7/2019 | Boon | .................... B60G 21/06 |
| 11,311,815 | B1 | * | 4/2022 | Trindle | ................ A63H 17/262 |
| 11,519,477 | B2 | * | 12/2022 | Marking | ............... F16F 9/3235 |
| 11,548,345 | B1 | * | 1/2023 | Jurrens | ................... F16F 9/084 |
| 11,718,141 | B2 | * | 8/2023 | Tabata | ................ B60G 21/055 280/5.506 |
| 12,151,527 | B1 | * | 11/2024 | Kollitz | ................ B60G 15/065 |
| 2004/0090019 | A1 | * | 5/2004 | Germain | ........... B60G 17/0162 280/5.502 |

(Continued)

*Primary Examiner* — Toan C To
(74) *Attorney, Agent, or Firm* — Schmeiser, Olsen & Watts LLP

(57) ABSTRACT

A shock absorber used with an integrated roll control system is provided. Embodiments include a first shock absorber having a first main piston and a first rebound chamber. Embodiments include a second shock absorber having a second main piston; and a second rebound chamber. Embodiments further include a roll control circuit, wherein the first shock absorber and the second shock absorber are coupled to the roll control circuit in a cross-linked configuration. Compression of the first main piston of the first shock absorber pushes a volume of hydraulic fluid into the roll control circuit and increasing pressure in the roll control circuit. Rebound movement of the second main piston is damped in response to the increased pressure provided by the hydraulic fluid entering the roll circuit and coupled to the second rebound chamber.

5 Claims, 14 Drawing Sheets

(56)  References Cited

U.S. PATENT DOCUMENTS

| | | | |
|---|---|---|---|
| 2009/0020966 A1* | 1/2009 | Germain ............ | B60G 21/0555 |
| | | | 280/124.106 |
| 2011/0187065 A1* | 8/2011 | Van Der Knaap ... | B60G 17/016 |
| | | | 280/5.507 |
| 2014/0217692 A1* | 8/2014 | Kato ...................... | B60G 15/12 |
| | | | 280/124.16 |
| 2014/0232082 A1* | 8/2014 | Oshita ............... | B60G 17/0162 |
| | | | 280/124.161 |
| 2019/0381848 A1* | 12/2019 | Barefoot ............... | B60G 11/27 |
| 2021/0003190 A1* | 1/2021 | Deferme ................. | F16F 9/464 |
| 2021/0018059 A1* | 1/2021 | Sankaran .............. | B60G 13/08 |
| 2021/0372499 A1* | 12/2021 | Slusarczyk .............. | F16F 9/50 |
| 2022/0128114 A1* | 4/2022 | Malec .................. | F16F 9/3257 |
| 2022/0380004 A1* | 12/2022 | Walker .................. | B60G 17/08 |
| 2023/0160452 A1* | 5/2023 | Iriondo .................. | F16F 9/516 |
| | | | 188/281 |
| 2023/0398828 A1* | 12/2023 | Zhang ................... | B60G 17/08 |
| 2024/0035539 A1* | 2/2024 | Nygren .................. | F16F 9/065 |
| 2024/0083210 A1* | 3/2024 | Zegveld ............. | B60G 17/0521 |
| 2024/0300275 A1* | 9/2024 | Anderson ................ | H02K 7/14 |
| 2024/0375472 A1* | 11/2024 | Bender ............... | B60G 15/061 |
| 2025/0010682 A1* | 1/2025 | Lee ........................ | B60G 17/08 |

* cited by examiner

To Rebound Side
of Chassis
Control Circuit
20

To Compression
Side of Chassis
Control Circuit
26

Vent or Air Pressure 22

19

Base Valve
24

Position Sensitive Damping
30

Main Piston Comp Valving 32

Main Piston Reb Valving
34

22
Air Vent/Air
Spring

18
Outer Sleeve

Compression Roll
Volume, Vc

Rebound Roll
Volume, Vr

10

20
Roll Rebound
Port

16
Main Piston

14
Internal Bypass

12
Outer Body

24
Base Valve

26
Roll Compression
Port

17

19

26
To Compression
Side of Chassis
Control Circuit

20
To Rebound Side
of Chassis
Control Circuit

22
Vent or Air Pressure

80
Optional
Base Valve

19

Position Sensitive Damping
30

Main Piston Comp Valving 32

Main Piston Reb Valving 34

DAMPER WITH INTEGRATED ROLL CONTROL SYSTEM

CROSS REFERENCE TO RELATED APPLICATION[S]

This application claims priority to U.S. Provisional Patent Application Ser. No. 63/648,050, filed May 15, 2024, the disclosure of which is hereby incorporated entirely herein by reference.

BACKGROUND OF THE INVENTION

Technical Field

This invention relates generally to a roll control system, and more particularly to a shock absorber used with an integrated roll control system.

State of the Art

Cross-linked systems have been used to passively control vehicle roll without the need for a sway bar. Traditional systems have the compression side of a damper linked to the rebound side in another damper (left/right) with accumulators. Existing systems are related to a coaxial damper with roll circuit. These existing systems include a solid damping piston that creates an annular area on the outside of the roll chambers. The damping fluid is separate from the roll fluid. These systems are lacking in their functionality.

Accordingly, there is a need for an improved shock absorber with an integrated roll control system that can be used with a cross-linked system.

SUMMARY OF THE INVENTION

An embodiment includes an integrated roll control system comprising: a first shock absorber comprising: a first compression chamber; and a first rebound chamber; a second shock absorber comprising: a second compression chamber; and a second rebound chamber; and a roll control circuit, wherein the first shock absorber and the second shock absorber are coupled to the roll control circuit in a cross-linked configuration, wherein: compression of the first shock absorber and rebound of the second shock absorber will push a volume of hydraulic fluid in the roll control circuit building pressure in the roll circuit to prevent roll. Compression of both the first and second shock absorber in equal amounts will push equal volumes of hydraulic fluid through the crosslinked system without building pressure in cases where roll control is not required.

Another embodiment includes an integrated roll control system comprising: a first shock absorber comprising: a first compression chamber; and a first rebound chamber; a second shock absorber comprising: a second compression chamber; and a second rebound chamber; and a roll control circuit comprising a first accumulator and a second accumulator, wherein: the first shock absorber and the second shock absorber are coupled to the roll control circuit in a cross-linked configuration with the first accumulator coupled between a compression side of the second shock absorber and the first rebound chamber of the first shock absorber and the second accumulator coupled between a compression side of the first shock absorber and the second rebound chamber of the second shock absorber, wherein: compression of the first shock absorber pushes a volume of hydraulic fluid into the second accumulator coupled to the second rebound chamber of the second shock absorber increasing pressure in the second accumulator; and rebound movement of the second shock absorber is damped in response to the increased pressure provided by the hydraulic fluid entering the second accumulator.

Another embodiment includes a shock absorber for use in an integrated roll control system, the shock absorber comprising: a shock outer body; an inner bypass body providing position sensitive damping; a compression chamber; an outer sleeve; and a rebound chamber, wherein: the shock absorber is configured to couple to a roll control circuit in a cross-linked configuration coupling compression chamber of the shock absorber to a rebound chamber of a second shock absorber and coupling the rebound chamber of the shock absorber to a compression chamber of the second shock absorber.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to shock absorber with an integrated roll control system that can be used with a cross-linked system.

Figure 1:
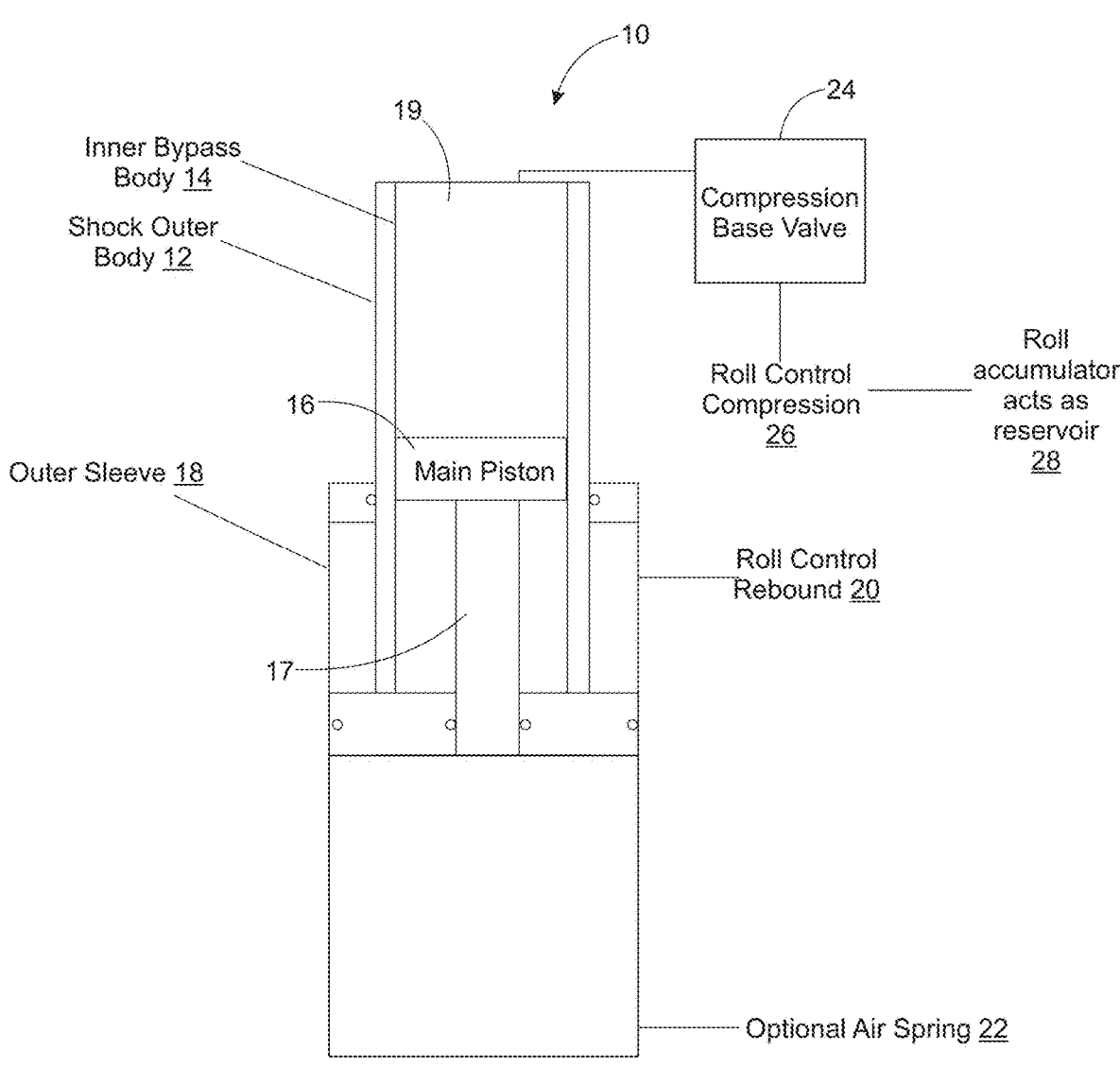
FIG. 1 is schematic view of a shock absorber with a shaft volume roll circuit according to an embodiment.
Figure 2:
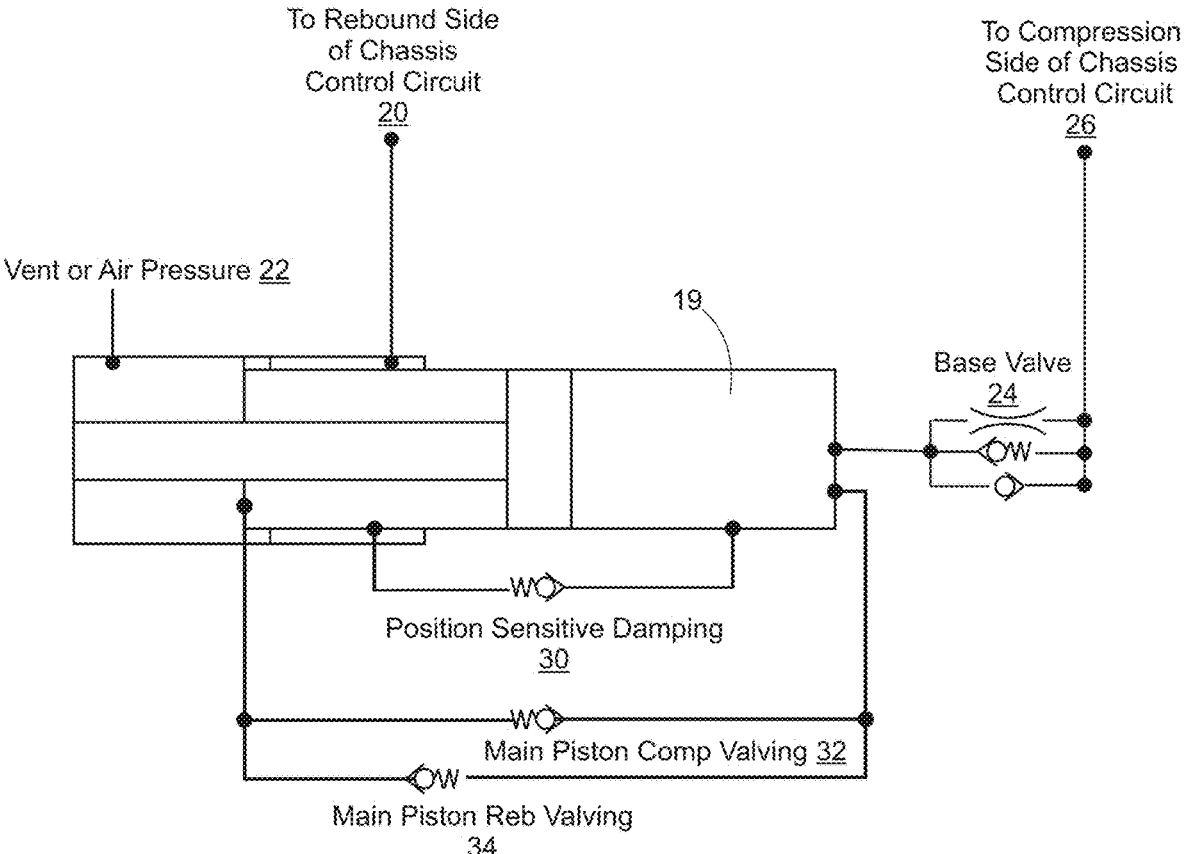
FIG. 2 is a schematic view of a hydraulic diagram of the shock absorber with a shaft volume roll circuit of FIG. 1 according to an embodiment.
Figure 3:
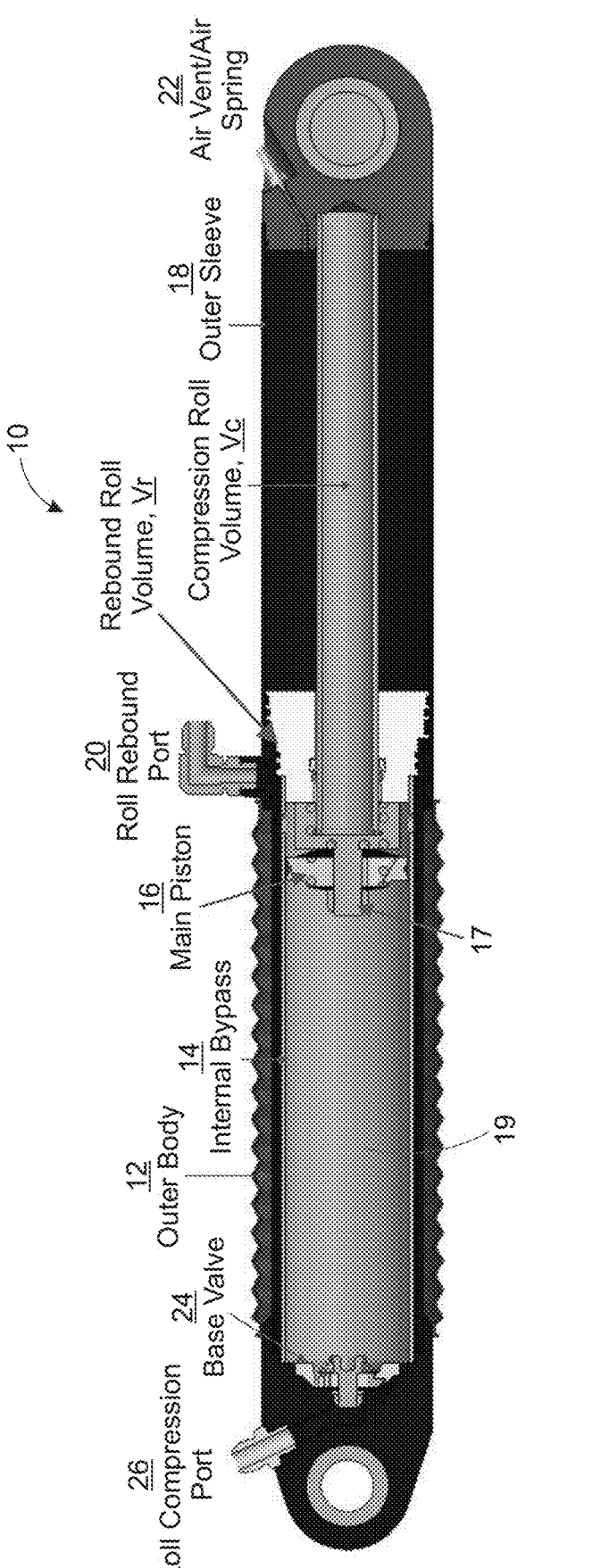
FIG. 3 is a cross section view of the shock absorber with a shaft volume roll circuit of FIG. 1 according to an embodiment.

Referring to FIGS. 1-3, one embodiment includes a shock absorber 10 with a shaft volume roll circuit. The shock absorber 10 comprises a shock outer body 12, an inner bypass body 14, a main piston 16, a compression chamber 19, an outer sleeve 18, a roll control rebound chamber 20, an optional air chamber 22, an optional base valve 24, and a roll control compression port 26. In embodiments, the rebound chamber 20 comprises an annular volume surrounding the compression chamber 19. The optional base valve 24 may be coupled to the roll control compression port 26. The roll control compression port 26 is coupled to a roll control circuit 66 (See FIG. 9) that is coupled to a roll accumulator or reservoir 28.

When in compression, the shock absorber 10 with a shaft volume roll circuit uses the shaft volume for the roll control. The compression roll flow exits through the roll compression port 26 at the top of the shock absorber 10, wherein the compression roll volume Vc that exits through the roll compression port 26 is substantially equal to the shaft volume of shaft 17 (See FIG. 3). In rebound, the separate shock outer body 12 will push fluid for the roll control rebound into the roll control rebound chamber 20, wherein a volume of the fluid for the roll control rebound is indicated as rebound roll volume Vr. As shown in FIG. 3, compression roll volume Vc and rebound roll volume Vr, are equal. In embodiments, the shock 10 can operate inverted (depending on desired porting location) and porting can likely be on same side of shock if desired. Further, a roost guard/boot can be added to protect the outer body 12.

FIG. 2 depicts a hydraulic diagram that explains how the roll control system operates with flow in compression exiting the shock 10 from the compression chamber 19, optionally through the optional base valve 24, and through a compression roll control port 26 to the chassis control circuit 56 (see FIG. 8) or roll control circuit 66 (see FIGS. 9-14). The hydraulic fluid may then be flowed, under control of the chassis control circuit 56 or roll control circuit 66, into the shock 10 and outer sleeve 18 into the roll control rebound chamber 20 of another shock 10 of the chassis control circuit 56 or roll control circuit 66. The optional air chamber 22 may be provided in the shock 10, that is depicted in the hydraulic diagram that allows for air to operate as a spring, to be vented, or the like. Additionally, the hydraulic diagram of FIG. 2 depicts other features of the shock absorber 10 that include, without limitation, a position sensitive damping 30 (such as internal bypass 14 depicted in FIG. 3), a main piston compression valving 32 and a main piston rebound valving 34 (such as a shim stack on the main piston 16 as depicted in FIG. 3). These features of the shock absorber 10 operate as intended and understood.

Figure 4:
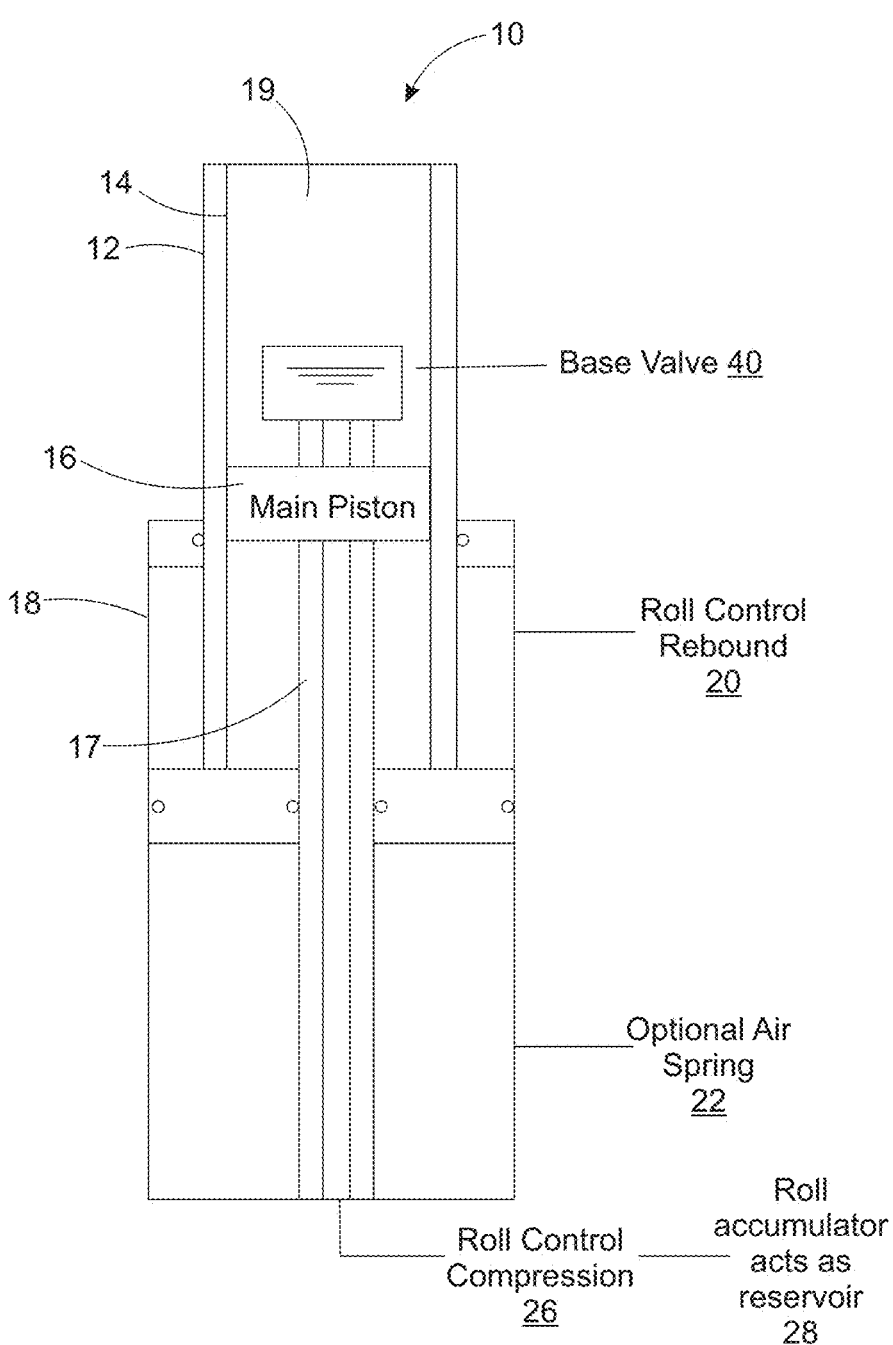
FIG. 4 is schematic view of a shock absorber having an internal base valve with a shaft volume roll circuit according to an embodiment.
Figure 5:
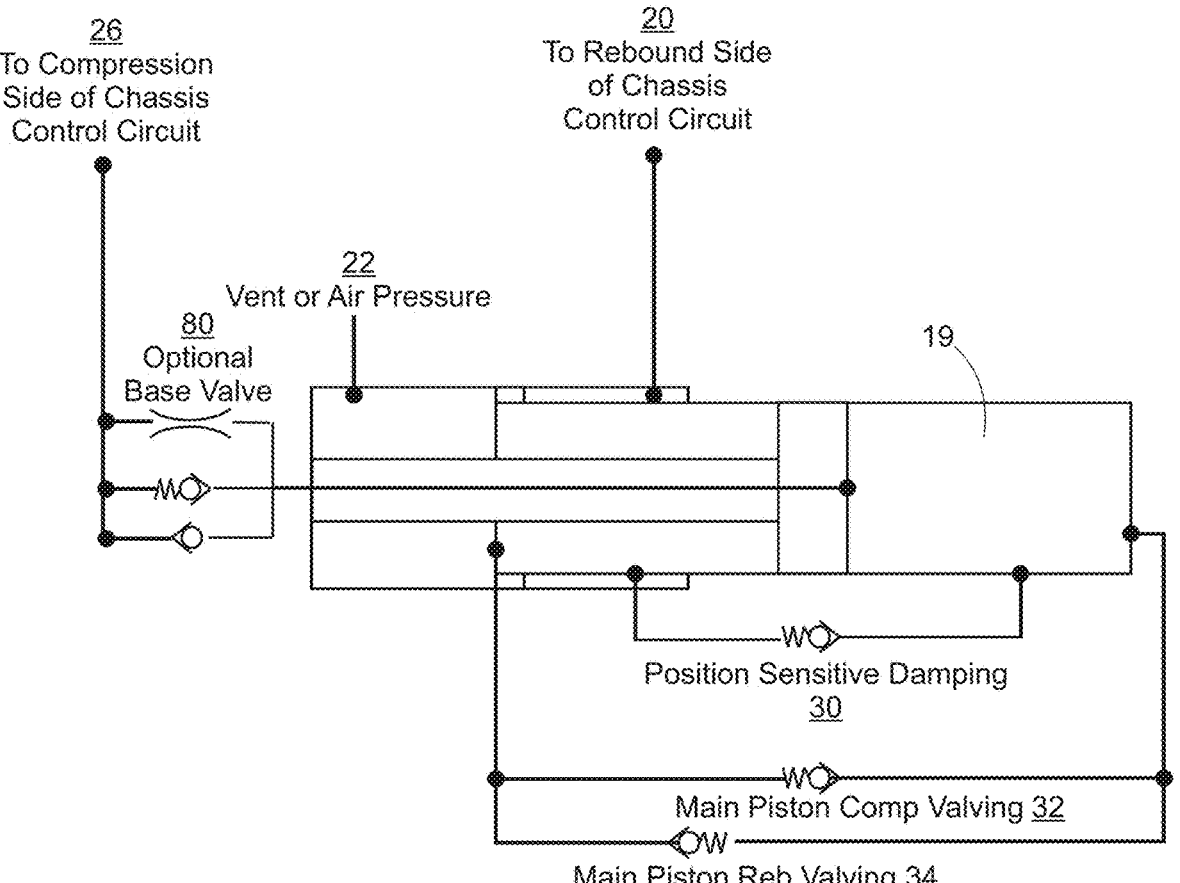
FIG. 5 is a schematic view of a hydraulic diagram of the shock absorber having an internal base valve with a shaft volume roll circuit of FIG. 4 according to an embodiment.

Referring to FIGS. 4-5, another embodiment includes a shock absorber 10 with a shaft volume roll concept with an internal base valve 40. The shock absorber 10 comprises a shock outer body 12, an inner bypass body 14, a main piston 16, a compression chamber 19, an outer sleeve 18, a roll control rebound chamber 20, an optional air chamber 22, an internal base valve 40, and a roll control compression port 26. In embodiments, the rebound chamber 20 comprises an annular volume surrounding the compression chamber 19. The internal base valve 40 is coupled to the roll control compression port 26. The roll control compression port 26 is coupled to a roll control circuit 66 (See FIG. 9) that is coupled to a roll accumulator or reservoir 28.

When in compression, the shock absorber 10 with a shaft volume roll circuit uses the shaft volume for the roll control. The compression roll flow exits the compression chamber 19 through the roll compression port 26 by flowing through the internal base valve 40 and through the piston rod 17. In rebound, a separate outer body 12 will push fluid for the roll control rebound through the roll control rebound chamber 20. This shaft volume roll circuit may be used with other shock architectures like internal bypass or reservoir out the bottom. The internal base valve 40 could be in eyelet or in valve block as needed. Further, the piston rod 17 may be a large hollow shaft that allows a volume of hydraulic flow needed for the internal base valve 40 and roll control operation.

Figure 8:
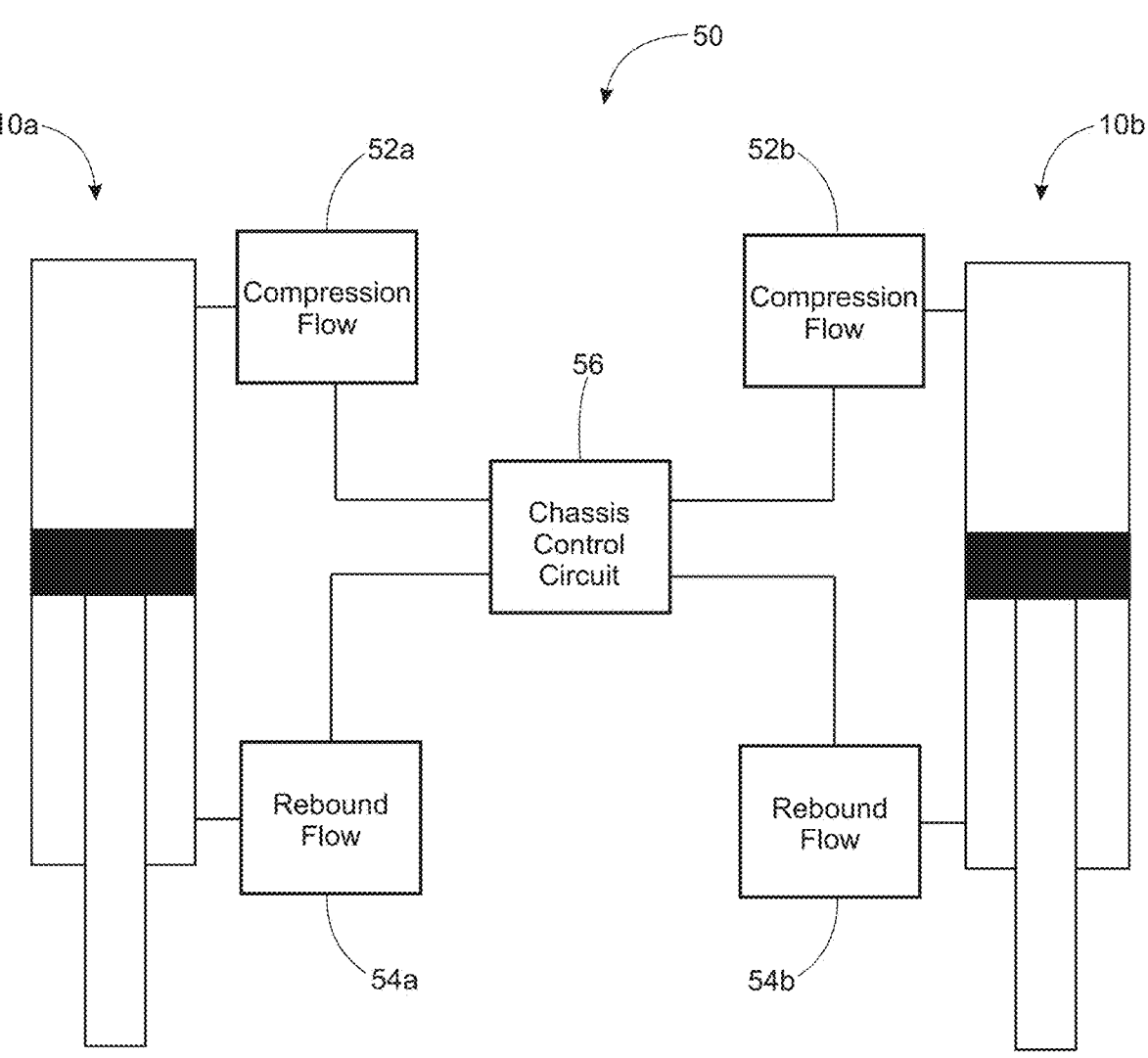
FIG. 8 is a schematic view of a chassis control circuit according to an embodiment.
Figure 9:
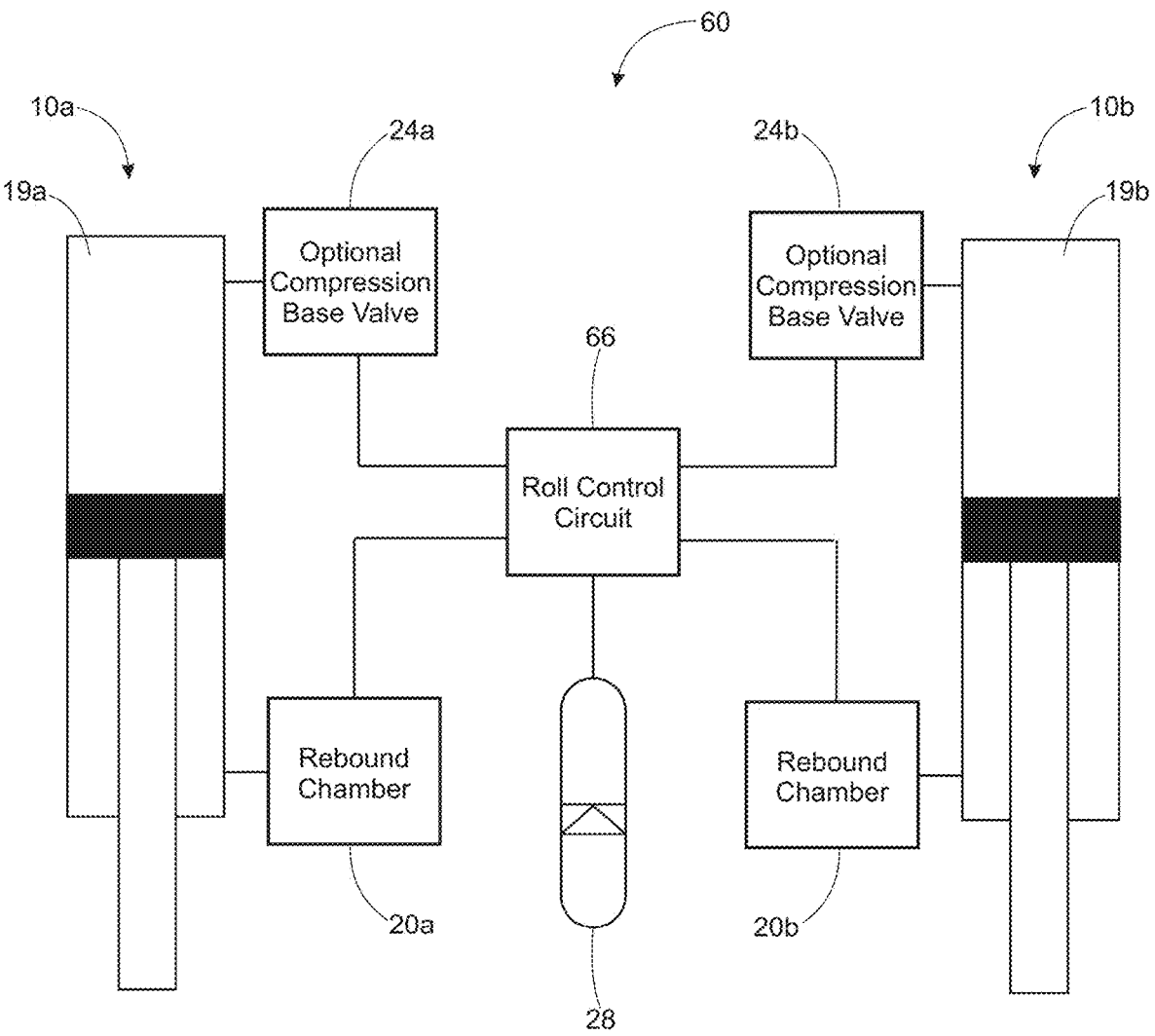
FIG. 9 is a schematic view of a roll control system according to an embodiment.

FIGS. 4 and 5 depicts a hydraulic diagram that explains how the roll control system operates with flow in compression exiting the shock 10 from the compression chamber 19 through the base valve 40 and through a compression roll control port 26 to the chassis control circuit 56 (see FIG. 8) or roll control circuit 66 (see FIG. 9). The hydraulic fluid may then be flowed, under control of the chassis control circuit 56 or roll control circuit 66, into the shock 10 and outer sleeve 18 through the roll control rebound chamber 20. The shock 10 may comprise an optional air chamber 22, as depicted, that allows for air to operate as a spring, to be vented, or the like. Additionally, the hydraulic diagram of FIG. 5 depicts other features of the shock absorber 10 that include, without limitation, a position sensitive damping 30 (such as internal bypass), a main piston compression valving 32 and a main piston rebound valving 34 (such as a shim stack on the main piston). These features of the shock absorber 10 operate as intended and understood.

Figure 6:
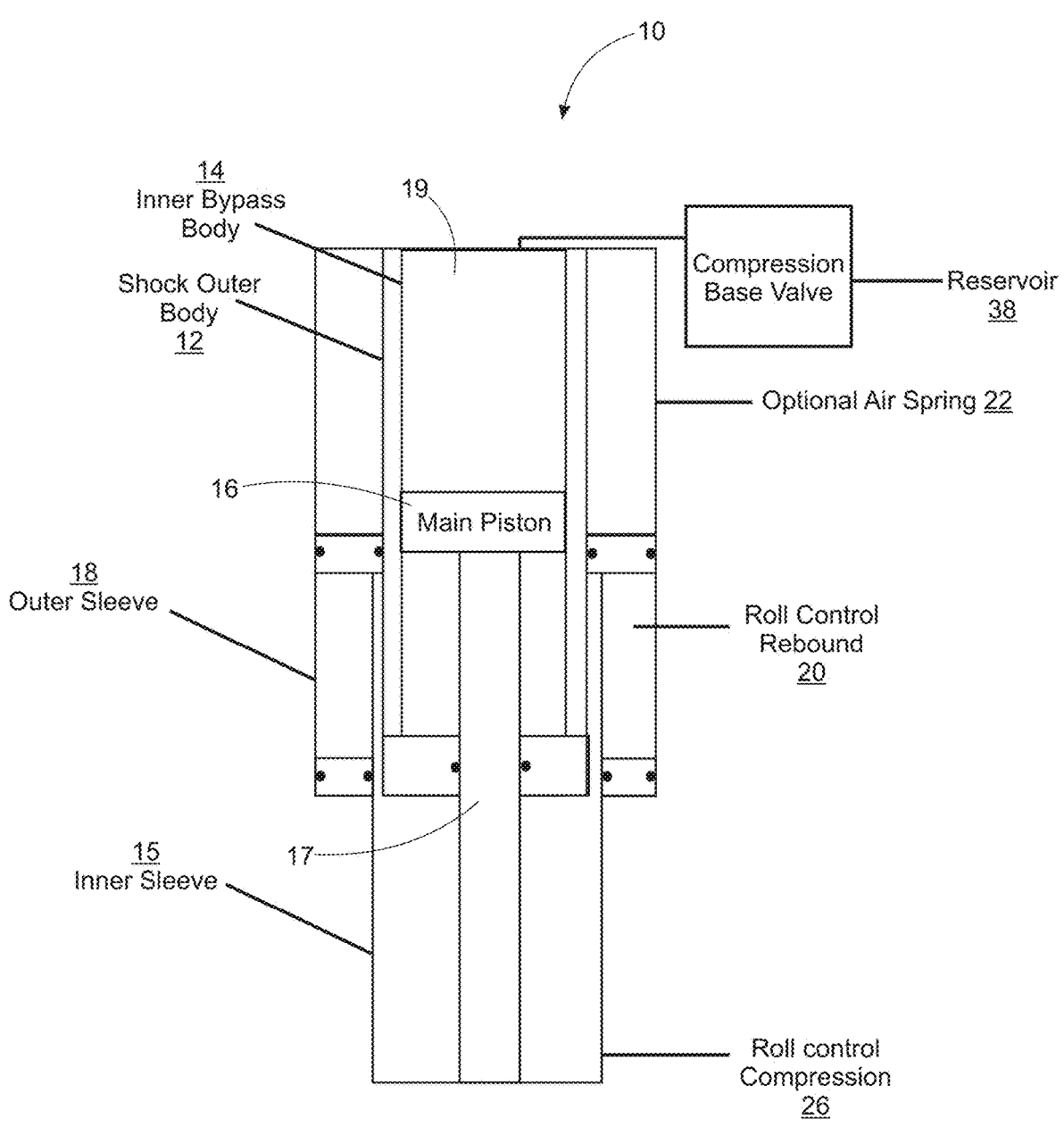
FIG. 6 is schematic view of a shock absorber with a body volume roll circuit according to an embodiment.
Figure 7:
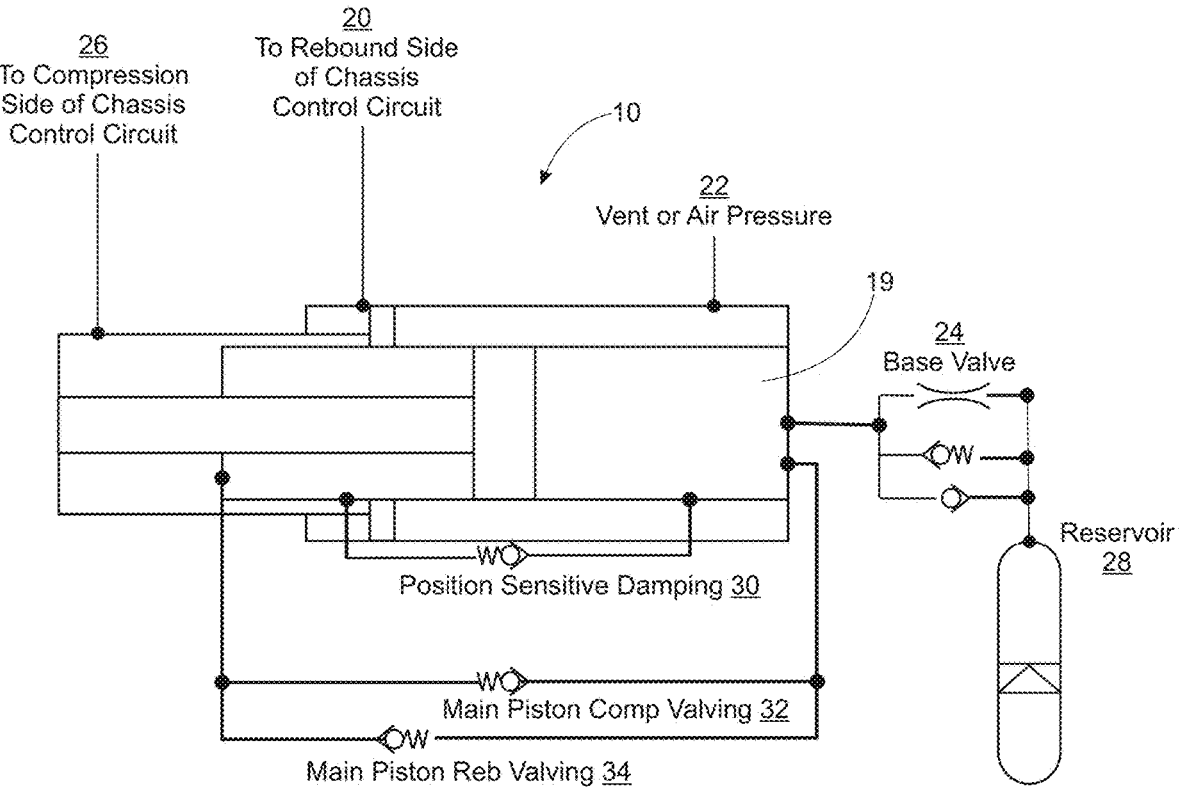
FIG. 7 is a schematic view of a hydraulic diagram of the shock absorber with a body volume roll circuit of FIG. 6 according to an embodiment.

Referring to FIGS. 6-7, another embodiment includes a shock absorber 10 with a body volume roll circuit. The shock absorber 10 comprises a shock outer body 12, an inner bypass body 14, a main piston 16, a compression chamber 19, an outer sleeve 18, an inner sleeve 15, a roll control rebound chamber 20, an optional air chamber 22, a base valve 24, and a roll control compression port 26. The base valve 24 is coupled to a reservoir 38.

When in compression, the annular area between the outer diameter of the shock outer body 12 and outer diameter of the shaft 17 sets the flow area in roll. In rebound, the area between the inner sleeve 15 and outer sleeve 18 must match the flow area in roll. This shaft volume roll circuit may be used with other shock architectures like internal bypass.

FIG. 7 depicts a hydraulic diagram that explains how the roll control system operates with flow, in compression, exiting the shock 10 through a compression roll control port 26 to the chassis control circuit 56 (see FIG. 8) or roll control circuit 66 (see FIG. 9). The hydraulic fluid may then be flowed, under control of the chassis control circuit 56 or roll control circuit 66, into the shock 10 and between the outer sleeve 18 and the inner sleeve 15 through the roll control rebound chamber 20. The shock 10 may comprise an optional air chamber 22, as depicted, that allows for air to operate as a spring, to be vented, or the like. Additionally, the hydraulic diagram of FIG. 7 depicts other features of the shock absorber 10 that include, without limitation, a position sensitive damping 30 (such as internal bypass), a main piston compression valving 32 and a main piston rebound valving 34 (such as a shim stack on the main piston). These features of the shock absorber 10 operate as intended and understood.

FIG. 8 depicts and embodiment of a chassis control 50. The chassis control 50 includes two or more shock absorbers 10, compression flow 52, rebound flow 54 and a chassis control circuit 56. This embodiment take any number of actions based on the design of the chassis control circuit 56, such as, but not limited to roll, pitch, heave and the like. The chassis control may be active, semi active, or passive. The chassis control 50 may connect just cross vehicle or to all four corners.

Figure 10:
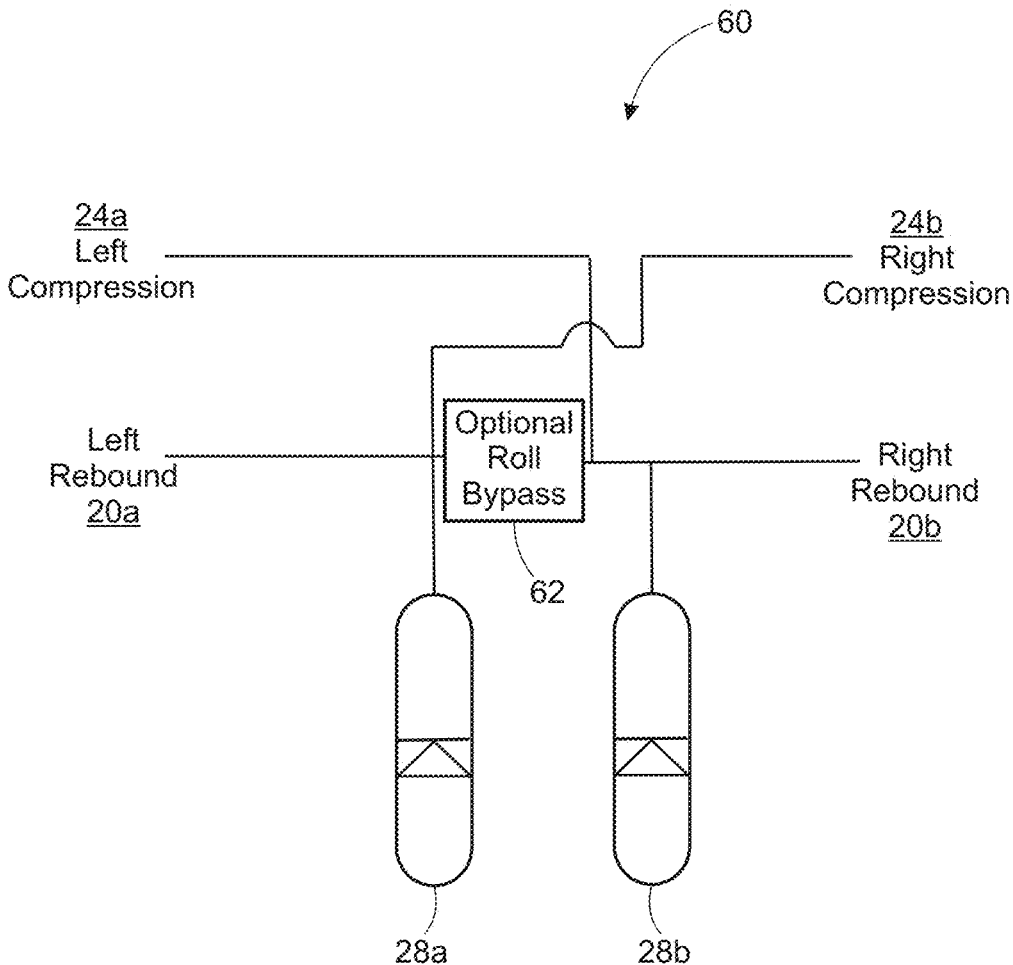
FIG. 10 is a schematic view of a roll control circuit with an optional roll bypass according to an embodiment.
Figure 11:
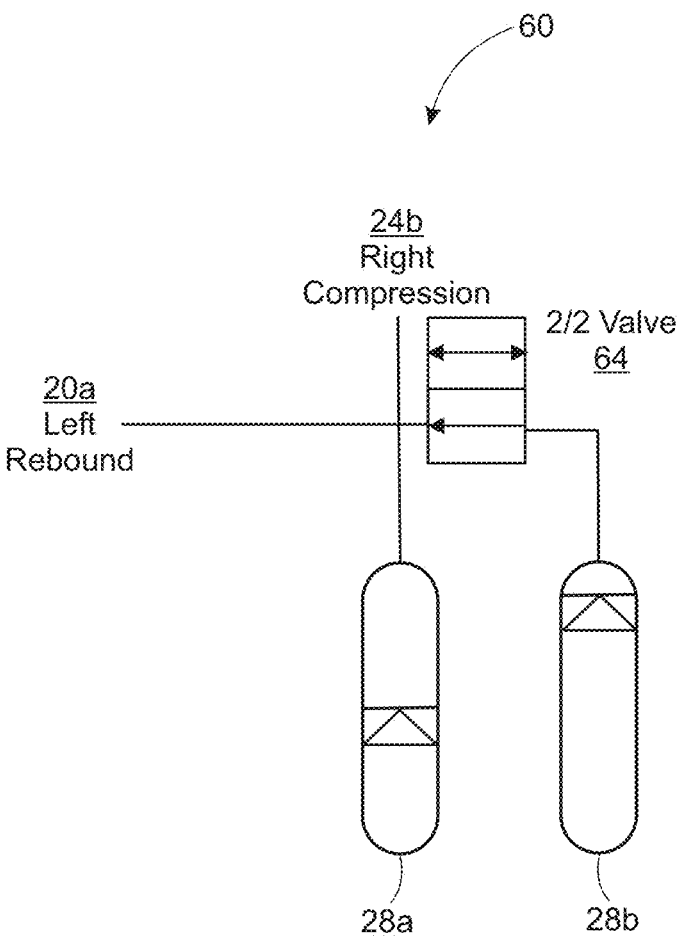
FIG. 11 is a schematic view of a multi-rate roll control circuit according to an embodiment.

FIGS. 9-11 depict various roll circuits. FIG. 9 depicts an embodiment of a roll control 60. The roll control 60 includes two or more shock absorbers 10 (such as first shock absorber 10a and second shock absorber 10b) two or more compression base valves 24 (such as first compression base valve 24a and second compression base valve 24b), two or more rebound base valves 20 (such as first rebound base valve 20a and second rebound base valve 20b), and a roll control circuit 66. The roll control 60 may optionally include an accumulator 28. Embodiments of the shock absorbers 10a and 10b may include a solid or nearly solid main piston 16a and 16b. Each shock 10a/10b may comprise an optional compression base valve 24a/24b and a rebound base valve 20a/20b. The optional compression base valves 24a/24b and a rebound chambers 20a/20b may include ports to allow the optional compression base valves 24a/24b to be and the rebound chambers 20a/20b to couple to a roll control circuit 66. This roll control circuit 66 may have many embodiments, however, in general, the roll control circuit 66 links the first compression chamber 19a of the first shock 10a to the second rebound chamber 20b of the second shock 10b. A single accumulator 28 or multiple accumulators 28 may be used, such as gas, spring, or combination accumulators 28. The accumulator 28 may have extra volume and the like for desired roll spring rate. The optional compression base valves 24a/24b and rebound chambers 20a/20b can control flow going to accumulators 28 for desired roll characteristics (stiff vs soft, and so forth). Each shock 10a/10b may be a twin tube to have porting exit on a same side of the shock 10a/10b, wherein the ports coupled to the optional compression base valve 24a/24b and the rebound chambers 20a/20b are on the same side of the shock 10a/10b. Embodiments of the invention may integrate bottom out/top out technologies such as hydraulic top out and bottom out control, and the like. Semi-active valves may also be used for a four-way adjust tuning configuration of the shock absorber 10a/10b.

FIG. 10 depicts a basic roll circuit 60 with a crosslinked design. The crosslinked design includes left compression 24a, right compression 24b, left rebound 20a, right rebound 20b, two accumulators 28a and 28b and an optional roll bypass valve 62 that may be used to disable the sway system. In this system, optional roll damping can also be added to the system. Roll characteristics can be controlled by volumes, initial pressures, adding springs, extra volume, and the like.

FIG. 11 depicts a multi-roll circuit 60 that depicts a left rebound 20a, a right compression 24b, two accumulators 28a and 28b and a valve 64. On each circuit 60, two accumulators 28a and 28b can be used. One accumulator is a stiff roll bar setting. Opening the valve 64 to bi-directional flow enables a multi-rate circuit that allows for more volume, and a less stiff roll bar.

Figure 12:
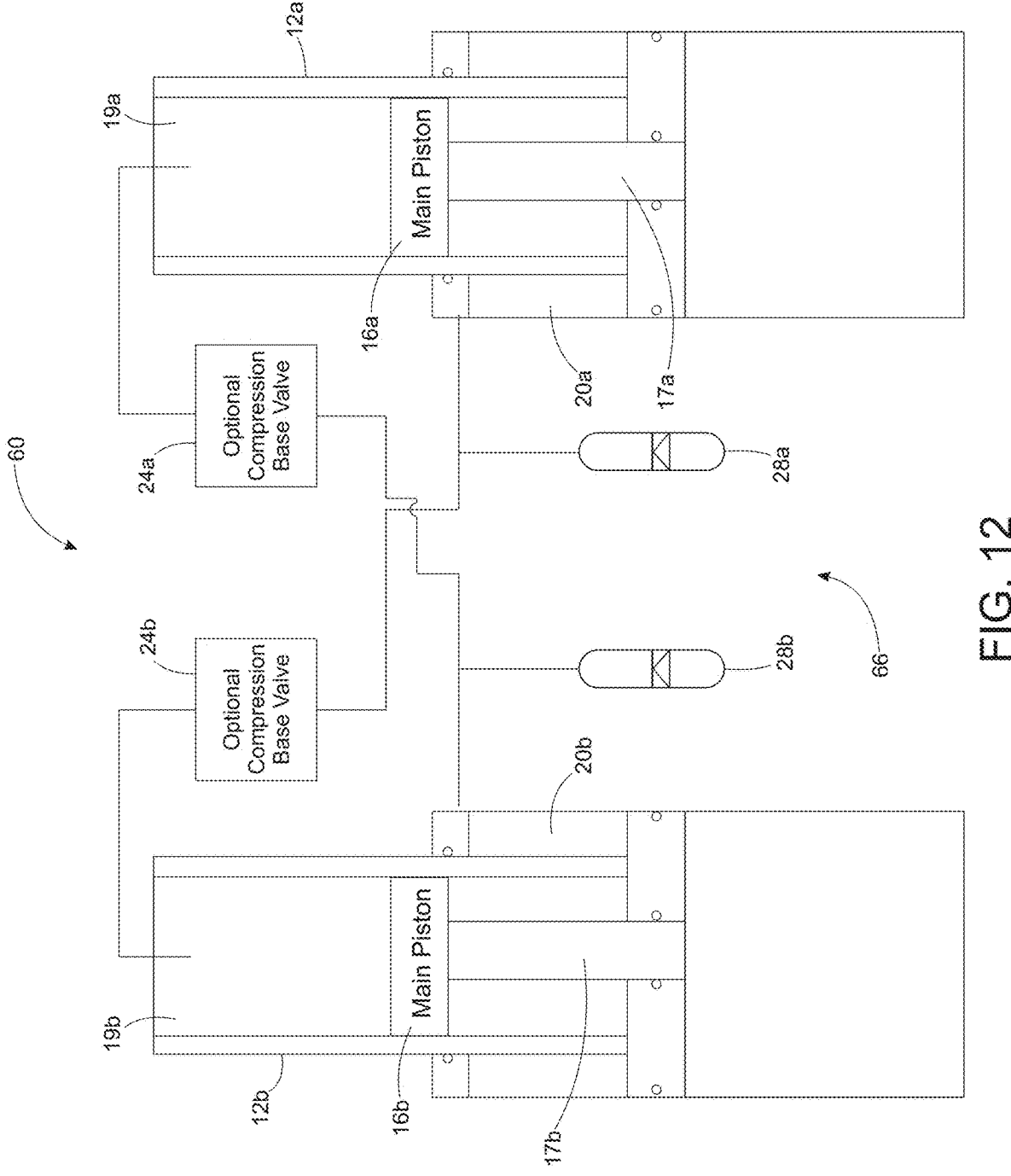
FIG. 12 is a schematic view of a roll control system according to an embodiment.
Figure 13:
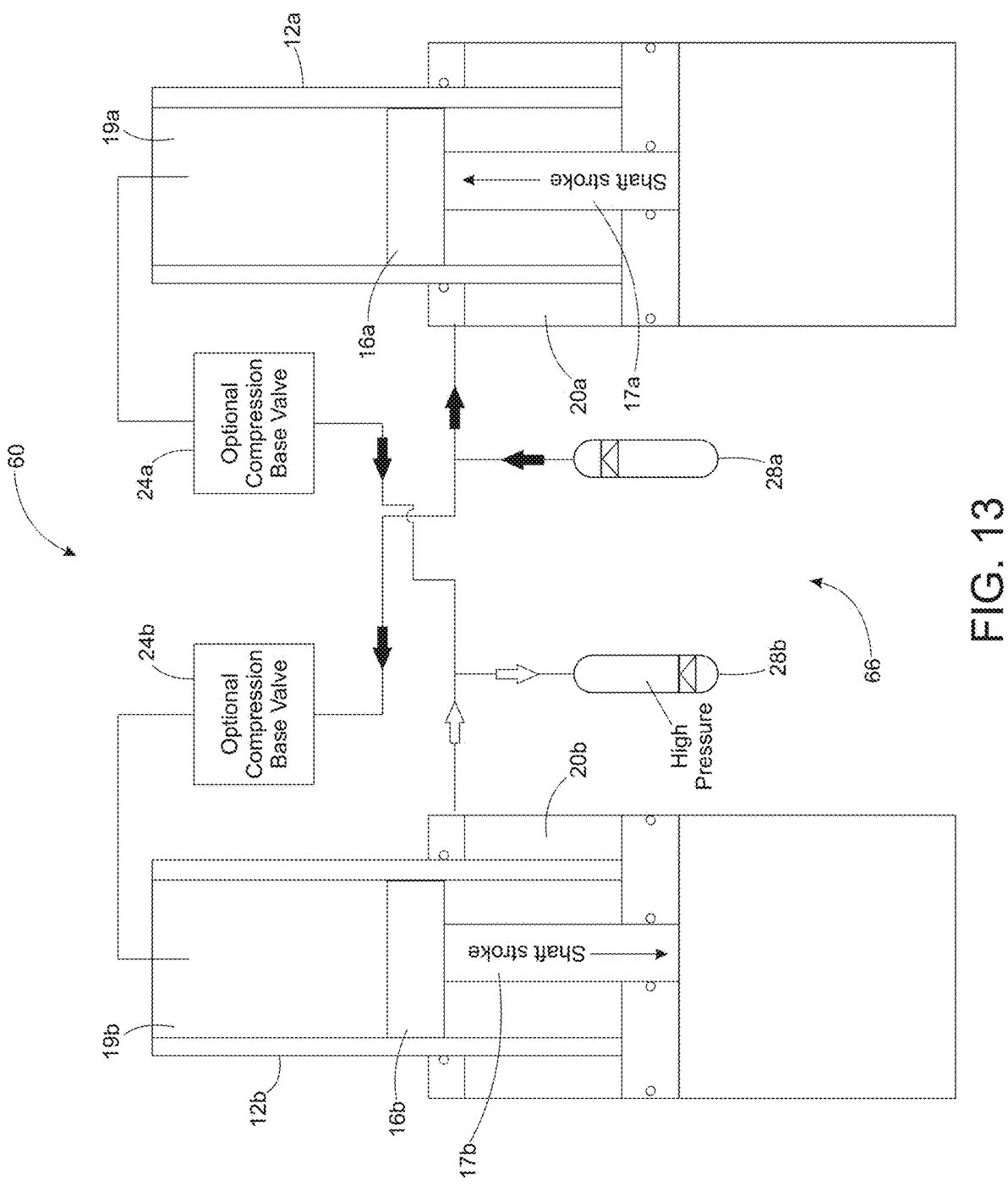
FIG. 13 is a schematic view of a roll control system in a roll articulation according to an embodiment.
Figure 14:
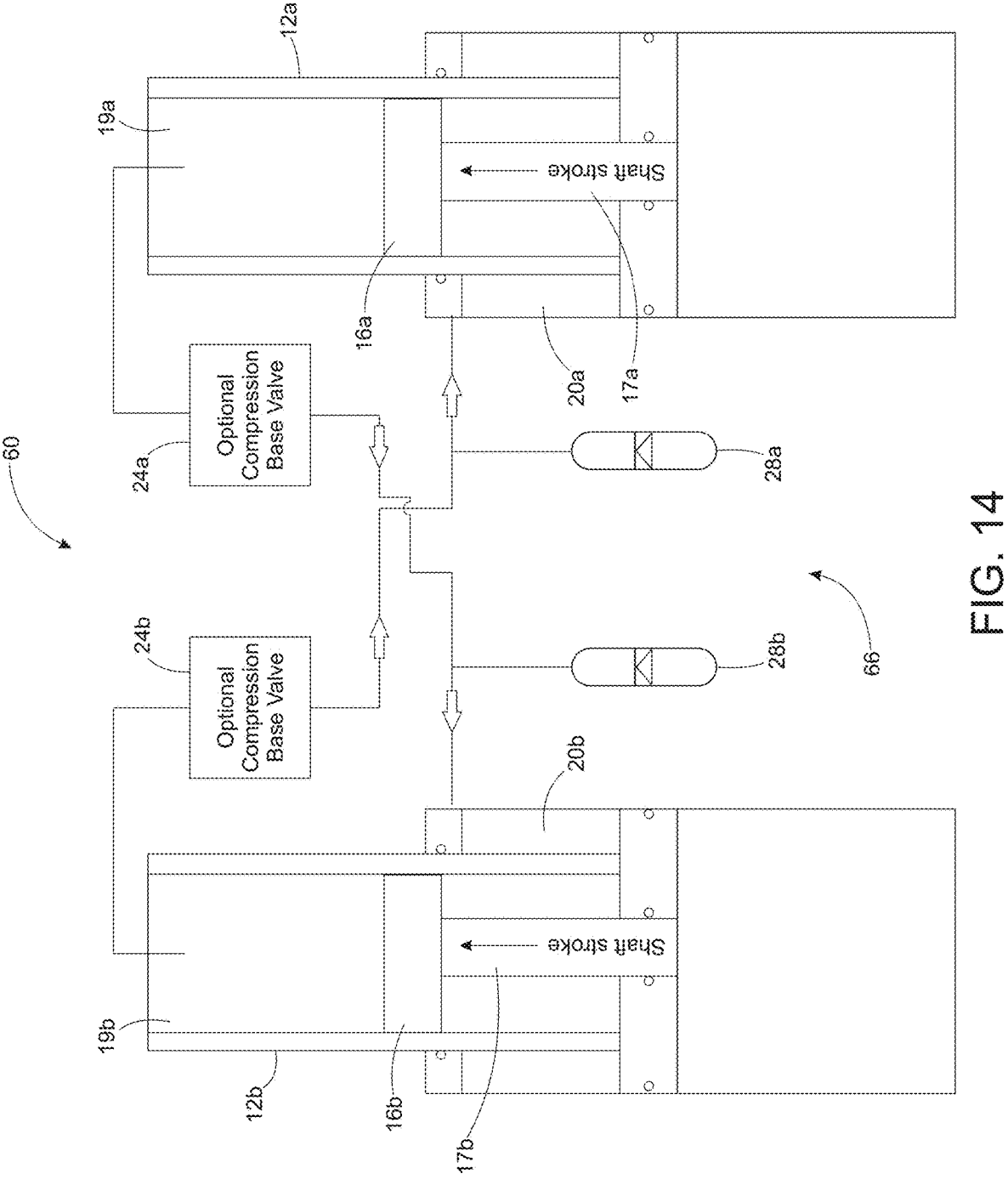
FIG. 14 is a schematic view of a roll control system in a heave/pitch according to an embodiment.

FIGS. 12-14 depict a particular embodiment of a roll control system 60 and the operation thereof according to an embodiment. As depicted in FIG. 12, the roll control system 60 may comprise a first shock absorber 10a and a second shock absorber 10b. The first shock absorber comprises a first main piston 16a, a first compression chamber 19a, and a first rebound chamber 20a. The first rebound chamber 20a comprises an annular volume surrounding the first compression chamber 19a. The second shock absorber 10b comprises a second main piston 16b, a second compression chamber 19b and a second rebound chamber 20b. The second rebound chamber 20b comprises an annular volume surrounding the second compression chamber 19b. The roll control system 60 may further comprise a roll control circuit 66 comprising a first accumulator 28a and a second accumulator 28b. The first shock absorber 10a and the second shock absorber 10b may be coupled to the roll control circuit 66 in a cross-linked configuration. A cross-linked configuration includes the first accumulator 28a coupled between the second compression chamber 19b of the second shock absorber 10b and the first rebound chamber 20a of the first shock absorber 10a and the second accumulator 28b coupled between the first compression chamber 19a of the first shock absorber 10a and the second rebound chamber 20b of the second shock absorber 10b.

FIG. 13 depicts an operation of the roll control system 60 during a roll articulation of a vehicle to which the roll control system 60 is coupled. In the roll articulation depicted in FIG. 13, the first shock absorber 10a performs a compression stroke. The compression stroke results in compression of the first main piston 16a of the first shock absorber 10a that pushes a volume of hydraulic fluid from the first compression chamber 19a into the second accumulator 28b coupled to the second rebound chamber 20b of the second shock absorber 10b, thereby increasing pressure in the second accumulator 28b. Rebound movement of the second main piston 16b is damped in response to the increased pressure in the second accumulator 28b. As shown by the filled in arrows of FIG. 13, roll volume from the second rebound chamber 20b and compression shaft volume from the first compression chamber 19a of the first shock absorber 10a must go to the second accumulator 28b, thereby building pressure and providing roll stiffness. The first rebound chamber 20a, the compression side of the second shock absorber 10b and the first accumulator 28a remain in a low pressure state as indicated in the open arrows of FIG. 13.

FIG. 14 depicts an operation of the roll control system 60 during a heave/pitch of a vehicle to which the roll control system 60 is coupled. In the heave/pitch depicted in FIG. 14, the first shock absorber 10a and the second shock absorber 10b perform a compression stroke or a rebound stroke simultaneously. These heave/pitch instances of a compression stroke results in compression of the first main piston 16a of the first shock absorber 10a that pushes a volume of hydraulic fluid from the first compression chamber 19a into the second rebound chamber 20b of the second shock absorber 10b and compression of the second main piston 16b of the second shock absorber 10b that pushes a volume of hydraulic fluid from the second compression chamber 19b into the first rebound chamber 20a of the first shock absorber 10a. These heave/pitch instances of a rebound stroke results in rebound of the first main piston 16a of the first shock absorber 10a that pushes a volume of hydraulic fluid from the first rebound chamber 20a into the second compression chamber 19b of the second shock absorber 10b and rebound of the second main piston 16b of the second shock absorber 10b that pushes a volume of hydraulic fluid from the second rebound chamber 20b into the first compression chamber 19a of the first shock absorber 10a. Accordingly, all roll volume moves from linked compression/rebound sides and does not build pressure for roll stiffness.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An integrated roll control system comprising:
a first shock absorber comprising:
   a first compression chamber; and
   a first rebound chamber;
a second shock absorber comprising:
   a second compression chamber; and
   a second rebound chamber; and
a roll control circuit comprising a first accumulator and a second accumulator, wherein: the first shock absorber and the second shock absorber are coupled to the roll control circuit in a cross-linked configuration with the first accumulator coupled between the second compression chamber of the second shock absorber and the first rebound chamber of the first shock absorber and the second accumulator coupled between the first compression chamber of the first shock absorber and the second rebound chamber of the second shock absorber, wherein:
   compression of the first compression chamber of the first shock absorber pushes a volume of hydraulic fluid into the second accumulator coupled to the second rebound chamber of the second shock absorber increasing pressure in the second accumulator; and rebound movement of the second main piston is damped in response to the increased pressure in the second accumulator.

2. The system of claim 1, wherein the first shock absorber further comprises a first base valve and the second shock absorber further comprises a second base valve.

3. The system of claim 1, wherein the first rebound chamber comprises an annular volume surrounding the first compression chamber, and the second rebound chamber comprises an annular volume surrounding the second compression chamber.

4. A shock absorber for use in an integrated roll control system, the shock absorber comprising:
   a shock outer body;
   an inner bypass body providing position sensitive damping;
   a compression chamber;
   an outer sleeve; and
   a rebound chamber, wherein:
      the shock absorber is configured to couple to a roll control circuit in a cross-linked configuration coupling compression chamber of the shock absorber to a rebound chamber of a second shock absorber and coupling the rebound chamber of the shock absorber to a compression chamber of the second shock absorber.

5. The system of claim 4, wherein the first rebound chamber comprises an annular volume surrounding the first compression chamber.

* * * * *